United States Patent Office 3,590,084
Patented June 29, 1971

3,590,084
1-(ALKYNYLPHENOXY)-2-HYDROXY-3-AMINO-
PROPANES AND THE SALTS THEREOF
Hendrik Adriaan Peperkamp, Van Houtenlaan, Weesp,
Netherlands, assignor to U.S. Philips Corporation, New
York, N.Y.
No Drawing. Filed Jan. 4, 1967, Ser. No. 607,167
Claims priority, application Netherlands, Jan. 7, 1966,
6600177
Int. Cl. C07c 93/06
U.S. Cl. 260—570.7                          4 Claims

ABSTRACT OF THE DISCLOSURE

Phenoxy-2-hydroxy-aminopropanes substituted in the ring by an unsaturated alkyl moiety. The moiety may be for example 2-propenyl or 2-vinyl. Specific examples are 1-(2-propenylphenoxy)-2-hydroxy-3-t. butylaminopropane and 1-{2-(butene-1-yl-1)phenoxy}-2-hydroxy-3-t. butylaminopropane. The compounds have $\beta$-adrenergic blocking properties and are useful in treating tachycardia.

---

The invention relates to novel phenoxypropylamines having an interesting pharmacological activity, to pharmaceutic preparations having a content of at least one of these compounds and to methods of producing these compounds and preparations.

From the Irish patent application 900/64 or Dutch patent application 6,409,883, Mar. 1, 1965, it is known that compounds of the Formula I:

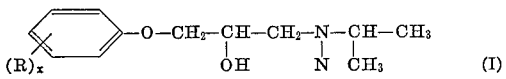

wherein R is among other things, a halogen atom, alkyl- or alkoxy-group having 1 to 4 carbon atoms and may have the value 1, 2 or 3 have a strong $\beta$-sympatholytic activity.

According to my invention I have prepared the novel compounds of the Formula II:

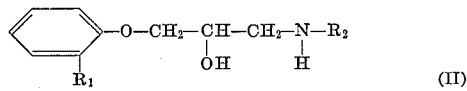

wherein $R_1$ is an unsaturated alkyl-group having 2 to 5 carbon atoms, the multiple carbon-carbon bond being in conjugation with the phenyl group, and $R_2$ is a saturated or unsaturated alkyl-, cycloalkyl-, or aralkyl group having 1 to 12 carbon atoms. I have found that these compounds and their acid addition salts with pharmaceutically acceptable acids, have an activity several times greater than that of the compounds described in said Irish patent application 900/64. My novel compounds according to the invention include both the stereo-isomers and the mixtures thereof.

Examples of groups represented by $R_1$ are the following: —CH=CH—CH$_2$—CH$_3$, —CH=C(CH$_3$)—CH$_3$, —CH=CH—CH(CH$_3$)$_2$, —C(CH$_3$)=CH—CH$_3$,

—C≡C—CH$_3$

—C≡C—CH$_2$—CH$_3$, —C≡C—CH(CH$_3$)$_2$ and

—CH=CHCH$_3$

Examples of groups represented by $R_2$ are the following: methyl, ethyl, t. butyl, propyl, vinyl, hexyl, dodecyl, cyclohexyl alkyl, cyclopentyl, phenylmethylene and m-phenylbutylene.

The compounds according to the invention, particularly those wherein $R_1$ is an alknyl-group have very drastic $\beta$-adrenergic blocking properties and are strong antagonists of $\beta$-sympathicomimetica, for example N-isopropylnoradrenaline.

Owing to these properties the compounds of the invention can be used, when administered in a suitable form, for suppressing or avoiding tachycardia caused by $\beta$-sympathicomimetica. They may furthermore be employed in treating certain forms of hypertension, angina pectoris, heart arkthmia, digitalis poisoning and phaeochromositoma.

An important property of the compounds of the invention is furthermore that they show little or no toxicity for warm-blooded animals. With 1-(2-ethynyl-phenoxy)-2-hydroxy-3-i.propylaminopropane for example a $$LD_{50}^{48}$$

of 133 mgs./kg. i.p. and more than 320 mgs./kg. orally and with 1-(2-vinylphenoxy)-2-hydroxy-3-i.propylaminopropane a $$LD_{50}^{48}$$

of 147 mgs./kg. i.p. and of more than 464 mgs./kg. orally were found.

It has furthermore been found that compounds of the invention have a strong effect on the control nerve system. They have in particular a strong anti-convulsive activity. This has been assessed by experiments carried out on mice; 60 minutes before a quantity of 50 mgs./kg. of metrasol was administered to the animals, a quantity of a compound according to the invention was given. It appeared that in accordance with the quantity administered the compound strongly suppressed or even completely prevented the convulsions caused by metrasol.

The $\beta$-sympatholytic activity of the compounds of the invention was assessed by experiments carried out on an isolated cavia atrium preparation, suspended in a Ringer solution and connected with a frequency counter. By adding N-isopropylnoradrenaline a frequency increase can be produced in this preparation. It was examined to what extent this frequency increase can be counteracted by administering a compound of the invention prior to that of n-isopropylnoradrenaline.

From this experiment it has been assessed that the compounds of the invention have a much stronger $\beta$-sympatholytic activity than the compounds described in said Irish patent application. It has been found for example that 1-(2-ethynylphenoxy)-2-hydroxy-3-i.propylaminopropane has a six times stronger activity than 1-(3-chlorophenoxy)-2-hydroxy-3-i.propylaminopropane, the compound described in the Irish patent application as being the most active one.

Dependent upon the nature and the seriousness of the infection to be combatted, the compounds of the invention may be administered in a quantity varying between about 20 and 400 mg. a day. Usually the daily dose will lie between 20 and 100 mg. Said quantities may be administered in one time or in several times. The correct dose and the most suitable scheme of administration can be easily found.

Examples of compounds according to the invention are:

1-(2-propenylphenoxy)-2-hydroxy-3-t. butylaminopropane,
1-{2-(propyn-1-yl-1)-phenoxy}-2-hydroxy-3-(1-methyl-3-phenylpropylamino)propane,
1-{2-(propyn-1-yl-1)-phenoxy}-2-hydroxy-3-cyclopentylaminopropane,
1-{2-(propyn-1-yl-1)-phenoxy}-2-hydroxy-3-i.propyl-aminopropane,
1-{2-(propyn-1-yl-1)-phenoxy}-2-hydroxy-3-t. butylaminopropane,
1-{2-(butene-1-yl-1)-phenoxy}-2-hydroxy-3-t. butylaminopropane,
1-{2-(3-methylbutene-1-yl-1)phenoxy}-2-hydroxy-3-(1-methyl-3-phenylpropylamino)propane, 1-(2-propenylphenoxy)-2-hydroxy-3-allylaminopropane,
1-{2-(3-methylbutyn-1-yl-1)phenoxy}-2-hydroxy-3-cyclopentylaminopropane, and furthermore salts of these compounds with pharmaceutically acceptable acids.

Acids with which the compounds according to the invention can form salts are, for example, hydrochloric acid, sulphuric acid, hydrobromic acid, phosphoric acid, sulphaminic acid, tartaric acid, citric acid, oxalic acid, acetic acid, benzoic acid, adipic acid and maleic acid.

The compounds according to the invention can be produced by methods known for the production of compounds of this type or by similar methods.

The compounds may be produced by reacting a compound of the Formula III:

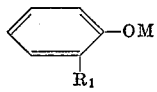

(III)

wherein $R_1$ has the same meaning as in Formula II and M is a hydrogen atom or an alkali metal with a compound of the Formula IV:

$$R_3-CH_2-N-R_2$$
$$|$$
$$R_4$$

(IV)

wherein $R_2$ has the same meaning as in Formula II, $R_3$ is a Hal-,

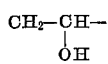

or a

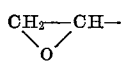

group, Hal indicating a halogen atom and $R_4$ is a hydrogen atom or a benzyl-group, the benzyl-group, if any, being separated out of the reaction product.

This reaction is preferably carried out in a solvent such as an alcohol, for example, ethanol, dioxane, dimethylformamide and water.

The benzyl-group can be separated out in the conventional way, for example, by reducing with sodium in liquid ammonia or in alcohol.

The alkynyl-compounds of Formula III may be obtained by starting from potassium phenolate, and by reacting this compound in benzene with 1-bromoalkene-2. The reaction product is then treated with alkali, so that the double carbon-carbon bond in the side chain of the phenol is shifted and conjugated with the phenyl nucleus.

Alkynyl-compounds of the Formula III may also be produced by adding to a compound of the Formula IIIa:

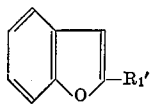

(IIIa)

wherein $R_1'$ is a hydrogen atom or an alkyl-group having 1 to 3 carbon atoms, a molecule of bromine and withdrawing HBr with the aid of sodium alcoholate in alcohol.

The compounds of the Formula IV can be produced by known methods. For example, a 1,3-dihalogen-propanol-2 or epihalogen-hydrine may be reacted with an amine of the Formula V:

$$NH-R_2-R_4$$  (V)

wherein $R_2$ and $R_4$ have the same meanings as Formula IV. By conventional methods, for example, by means of a strong base, the epoxide can be obtained from the resultant halogen hydrine.

A further method of producing compounds of the Formula II consists in that a compound of the Formula VI:

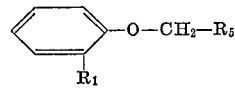

(VI)

wherein $R_1$ has the same meaning as Formula II and $R_5$ is a

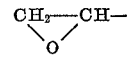

a Hal—CH$_2$—CH—, or an $R_6$OOC—CH—group
     |                              |
     OH                             OH Hal is a halogen atom and $R_6$ is an alkyl- or an aralkyl-group is reacted with an amine of the Formula V, while the amide group, if formed, is reduced and the benzyl-group, if any, is separated off from the reaction product in the way described above.

In this reaction the amine may be used as a solvent. It is furthermore possible to employ a polar solvent, such as ethanol.

The halogen hydrines of the Formula VI may be obtained by reacting a compound of the Formula III with an epihalogen hydrine, for example epichlorohydrine. The epoxides of the Formula VI may be produced in a conventional way, for example from the aforesaid halogen hydrines of the Formula VI.

The α-hydroxy carboxylic acid esters of the Formula VI may be produced by reacting a phenol of the Formula III in an appropriate solvent, for example, ethanol, with an α-hydroxy-β-halogen propionic acid ester.

Compounds according to the invention may also be produced by alkylating reductively or non-reductively a compound of the Formula VII:

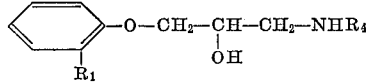

(VII)

in which formula $R_1$ has the same meaning as in Formula II and $R_4$ is a hydrogen atom or a benzyl group, and by separating off the benzyl group, if any after bonding.

This alkylation reaction may be carried out with a compound of the Formula VIII:

$$X—R_2'$$  (VIII)

wherein X is a Hal—CH$_2$—group, a

$R_2'$ is a group like $R_2$ but with one carbon atom less and Hal is a halogen atom, while if X is a

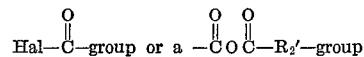

the bonding product is reduced. This reduction may be carried out by means of a hydride, for example lithium-aluminum hydride.

The reaction may furthermore be carried out by means of a reagent of the Formula IX:

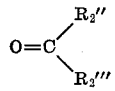

(IX)

wherein $R_2''$ and $R_2'''$, together with the carbon atom of the carbonyl group form a substituent of the group represented by $R_2$ in Formula II. When this reagent is used, the production starts from a compound of the Formula VII, wherein $R_4$ is a hydrogen atom, the coupling product being reduced by a hydride, for example sodium-boron hydride, lithium-aluminum hydride and diisobutyl-aluminum hydride.

The compounds of the Formula II can also be obtained by reducing a compound of the Formula X:

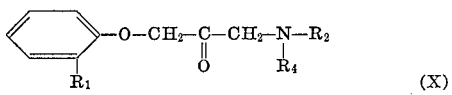

wherein $R_1$, $R_2$ and $R_4$ have the aforesaid meanings, and by separating off the benzyl-group, if any. The reduction is preferably carried out with a hydride, for example, sodium-boron hydride, lithium-aluminum hydride, diisobutyl-aluminum hydride. A compound of the Formula X may be produced by coupling a compound of the Formula III with a 1,3-dihalogen-acetone, for example 1,3-dichloroacetone to obtain a compound of the Formula XI:

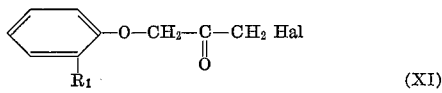

which substance is subsequently converted in a solvent, for example benzene, ethanol, with an amine of the Formula V. Heat may be used to ensure a complete reaction.

The compounds of the Formula II may furthermore be preduced by reducing a compound of the Formula III:

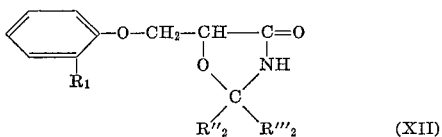

wherein $R_1$ has the meaning indicated in Formula II and $R''_2$, $R'''_2$ have the same meanings as in Formula IX, for example by means of lithium-aluminum hydride.

A compound of the Formula XII may be obtained by condensation of a compound of the Formula IX with an amide of the Formula XIII wherein $R_1$ has the same meaning as in Formula II:

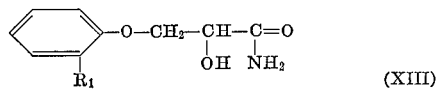

Compounds of the Formula XIII may be produced by classical methods, for example, by the addition of a compound of the Formula III to the amide of 2,3-epoxypropionic acid.

The alkenyl compounds of the Formula II may also be produced from a compound of the Formula XIV:

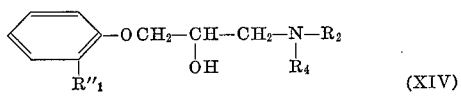

wherein $R_2$ and $R_4$ have the same meanings as in Formula IV and $R''_1$ is an alkenyl group having 2 to 5 carbon atoms, the double carbon-carbon bond of which is situated between the $\beta$ and $\gamma$-carbon atom. Compounds according to the invention are obtained by treating a compond of the Formula XIV with a strong base, for example KOH, NaOH, triethylamine, pyridine. The reaction is preferably carried out in a solvent, for example an alcohol such as methanol, ethanol and the like. If $R_4$ represents a benzyl group, this is separated out after the reaction as described above.

The starting substances of the Formula XIV can be produced by reacting a compound of the Formula XV:

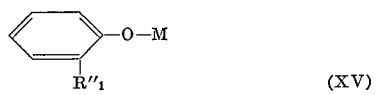

wherein $R''_1$ has the same meaning as in Formula XIV and M is an alkali-metal atom or a hydrogen atom with a compound of the Formula IV, while the compounds of the Formula XV may be obtained by reacting for example alkali-phenolate or phenol with 1-bromo-alkene-2.

The compounds according to the invention may be worked up by known methods to obtain pharmaceutical preparations by mixing them or dissolving them with or in pharmaceutically acceptable solid, liquid or gaseous carriers.

Such pharmaceutical preparations are for example, tablets, dragees, powders, aqueous or oily solutions, suppositories, capsules and aerosols.

Suitable carriers are, for example, water, glycerine, chalk, calcium phosphate, lactose, saccharose, calcium carbonate, halogenated hydrocarbons.

Tablets and dragees may furthermore contain welling agents, which provide a ready decomposition of the preparation in water. Such agents, are, for example, potato starch, maize starch, arrow root (amilum marantea), carboxy-methyl cellulose, gelatine and acacia gum. Lubricants may be, for example, talcum, magnesium and calcium stearate and stearic acid.

Preparations to be administered orally may furthermore contain flavorings, for example, sugars or vanilla extract.

The preparations may furthermore contain preserving agents, for example, propyl-p-hydroxybenzoate and benzyl alcohol, as well as surface-active substances such as mono-, di- and triesters of higher fatty acids.

My invention will now be described in greater detail with reference to the following examples.

Examples of compositions of preparations according to the invention are:

(1) 1-(2-vinylphenoxy)-2-hydroxy-3-isopropylamino-propane-hydrochloride 3.25 ml. (2.24 g.; 38.0 mmol) of isopropylamine and 2.24 ml. of water were added to a solution of 3.16 g. (17.9 mmol) of O-(2,3-epoxypropoxy) styrene in 15 ml. of alcohol. The resultant solution was heated at 60° for two hours and evaporated to dryness in vacuo. The residue was dissolved in 25 ml. of chloroform and this solution was evaporated to dryness in vacuo in order to remove the last traces of water. This yielded 4.23 g. of an oil which crystallized practical immediately. The crystalline substance was dissolved in 10 ml. of absolute alcohol, after which about 4 N alcoholic hydrochloric acid was added up to the acidic reaction. Then 125 ml. of dry ether was added as a diluent. The solution yielded an oil which became crystalline after some scratching. After filtering, washing with dry ether and drying in air, 3.17 g. of the substance was obtained; melting point 102–5°. From the filtrate crystallized, after some time, 0.60 g. of the substance; melting point 95–9°. The two portions of crystalline substances were together dissolved in 10 ml. of absolute alcohol. This solution was diluted with 50 ml. of dry ether, and an oil separated out again. After decanting from the oil, the solution was further diluted with 15 mls. of dry ether and then kept for one weekend at 5°. 2.97 g. (61%) of the substance crystallized out; melting point 102–4°.

(2) 1-(2-propenylphenoxy)-2-hydroxy-2-isopropylamino-propane-hydrochloride (a) 1-(2-propenylphenoxy)-2,3-epoxypropane 13.4 g. (100 mmol) of O-propenyl-phenol was added while stirring, to a solution of 4.80 g. (120 mmol) of sodium hydroxide in 100 mls. of water. Then 11.8 ml. (13.9 g.; 1550 mmol) of epichlorohydrine was added. The mixture was stirred at room temperature for 26 hours. 25 ml. of chloroform was added and the layers were separated. The aqueous layer was extracted twice with 25 ml. of chloroform. The combined chloroform extracts were evaporated to dryness in vacuo, subsequent to drying on sodium sulphate. The residue was distilled. The yield was 9.56 g. (50%); melting point 94–7° (0.15 mm.).

(b) 1-(2-propenylphenoxy)-2-hydroxy-3-isopropyl-aminopropane-hydrochloride

A solution of 9.56 g. (50.3 mmol) of 1-(2-propenyl-phenoxy)-2,3-epoxypropane, benzene in 26 ml. (250 mmol) of 70% isopropylamine solution was heated at 60° for two hours. The reaction mixture was then evaporated to dryness in vacuo. The residue crystallized after two evaporations to dryness in vacuo with benzene. It was dissolved in 25 ml. of absolute alcohol. About 3 N alcoholic hydrochloric acid was added until acidic reaction. The resultant solution was diluted with 750 ml. of dry ether and kept at 5° overnight. The next day 12.02 g. (84%) of the substance had crystallized out; melting point 114–6°.

(3) 1-(2-ethynylphenoxy)-2-hydroxy-3-isopropylamino-propane-hydrochloride 12.0 g. (102 mmol) of O-ethynylphenol was added with stirring, to a solution of 4.76 g. (119 mmol) of sodium hydroxide in 100 mls. of water. Then while stirring, 11.8 ml. (13.9 g.; 150 mmol) of epichlorohydrine was added. This mixture was stirred at room temperature for 17 hours. The layers were subsequently separated. The aqueous layer was extracted three times with 25 mls. of chloroform. The extracts, together with the separated oil, were dried on sodium sulphate and then 40 ml. of the resultant solution was evaporated to dryness at 35°/0.1 mm. The yield was 6.34 g. of light-orange oil, which was dissolved in 10 mls. of 70% isopropylamine solution; the solution was heated at 60° for two hours and then evaporated to dryness in vacuo. The residue (8.17 g.) was dissolved in 40 ml. of benzene. This solution was extracted with 25 mls. of 2 N hydrochloric acid and then with 15 ml. of water. The extracts were washed together with 25 ml. of ether, rendered alkaline with 10 mls. of 50% potassium lye and then extracted with 25 and 10 ml. of carbon tetrachloride and 25 ml. of chloroform. These extractions were collected and, after the addition of 25 ml. of benzene, they were dried on sodium sulphate. After filtering and evaporation to dryness in vacuo, 7.70 g. of oil was obtained, which crystallized immediately. The substance was dissolved in 25 ml. of absolute alcohol and to this solution was added about 3.5 N alcoholic hydrochloric acid until acidic reaction and then 150 mls. of ether was added. From this solution crystallized 6.10 g. of the substance, yielding, subsequent to recrystallization from a mixture of 30 ml. of absolute alcohol and 150 mls. of ether, 5.61 g. of a light colored product; melting point 144–45.5° A white product can be obtained by recrystallizing the substance from methyl-ethyl ketone. The melting point did not change.

Examples of compositions of preparations according to the invention are:

Injection liquid 1 g. of 1-(2-ethynylphenoxy)-2-hydroxy-3-i.propylamino-propane,
1.80 g. of methyl-p-hydroxy-benzoate,
0.20 g. of propyl-p-hydroxy-benzoate,
9.0 g. of sodium chloride
4.0 g. of polysorbate 80 U.S.P.
Water up to 1000 ml.

Tablet 20 mg. of 1-(2-propenylphenoxy)-2-hydroxy-3-i.propyl-aminopropane,
335 mg. of lactose
60 mg. of potato starch
25 mg. of talcum
5 mg. of magnesium stearate
5 mg. of gelatine

Suppository 15 mg. of 1-(2-vinylphenoxy-2-hydroxy-3-i.propylamino-propane, 1500 mg. of suppository material.

While I have described my invention in connection with specific embodiments and applications, other modifications thereof will be readily apparent to those skilled in this art without departing from the spirit and scope of the invention as defined in the appended claims.

What I claim is:

1. A compound selected from the group consisting of a base of the formula:

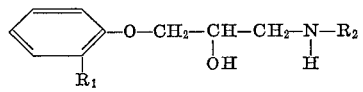

wherein $R_1$ is alkynyl of 2 to 5 carbon atoms inclusive with the unsaturation between the 1 and 2 carbon atoms and $R_2$ is a member selected from the group consisting of saturated alkyl of 1 to 12 carbon atoms inclusive, vinyl, allyl, cyclohexyl, cyclopentyl, 1-methyl-3-phenylpropyl, phenylmethylene and phenylbutylene and the acid addition salts thereof with pharmaceutically acceptable acids.

2. A compound selected from the group consisting of 1-(2-vinylphenoxy)-2-hydroxy-3-i.propylamino - propane and the acid addition salts thereof with pharmaceutically acceptable acids.

3. The compound of claim 1 wherein the base is 1-(2-vinylphenoxy)-2-hydroxy-3-i.propylaminopropane.

4. The compound of claim 1 wherein the base is 1-(2-ethynylphenoxy)-2-hydroxy-3-i.propylaminopropane.

References Cited

UNITED STATES PATENTS

| | | | |
|---|---|---|---|
| 3,033,640 | 5/1962 | Hofer et al. | 260—570.7X |
| 3,275,629 | 9/1966 | Brizer | 260—570.7X |
| 3,331,850 | 7/1967 | Youngdale | 260—570.7X |
| 3,466,325 | 8/1969 | Brandstrom et al. | 260—570.7X |

ROBERT V. HINES, Primary Examiner

U.S. Cl. X.R.

260—307, 346.2, 348, 473, 501.17, 501.18, 559, 570.9, 592, 612, 621; 424—330